(12) United States Patent
Kotler et al.

(10) Patent No.: US 8,430,671 B2
(45) Date of Patent: Apr. 30, 2013

(54) GOOD BEHAVIOR MOTIVATION GAME FOR CHILDREN AND METHOD OF USE

(76) Inventors: Michael I. Kotler, Delray Beach, FL (US); Nicole Berger, Boca Raton, FL (US)

( * ) Notice: Subject to any disclaimer, the term of this patent is extended or adjusted under 35 U.S.C. 154(b) by 510 days.

(21) Appl. No.: 12/757,518

(22) Filed: Apr. 9, 2010

(65) Prior Publication Data

US 2010/0285433 A1 Nov. 11, 2010

Related U.S. Application Data

(60) Provisional application No. 61/175,928, filed on May 6, 2009, provisional application No. 61/258,335, filed on Nov. 5, 2009.

(51) Int. Cl.
*G09B 19/22* (2006.01)

(52) U.S. Cl.
USPC .......................................................... 434/128

(58) Field of Classification Search ................. 434/128
See application file for complete search history.

(56) References Cited

U.S. PATENT DOCUMENTS

| | | | |
|---|---|---|---|
| 1,638,094 A | 8/1927 | Gilmour | |
| 2,414,614 A | 1/1947 | Shurick, Sr. | |
| 2,883,765 A | 4/1959 | Blaine | |
| 3,782,009 A | 1/1974 | Darnell | |
| 4,076,249 A * | 2/1978 | Sneathen, Jr. | 273/256 |
| 4,273,337 A | 6/1981 | Carrera et al. | |
| 4,609,356 A * | 9/1986 | Gilden et al. | 434/259 |
| 4,776,799 A | 10/1988 | Walsh | |
| 4,930,789 A * | 6/1990 | Harris et al. | 273/256 |
| 4,953,874 A * | 9/1990 | Golomb | 273/355 |
| 5,228,698 A * | 7/1993 | Dubarry, Jr. | 273/256 |
| 5,429,373 A * | 7/1995 | Chelko et al. | 273/440 |
| 5,470,235 A | 11/1995 | Papaleo | |
| 5,482,487 A | 1/1996 | Harris | |
| 5,516,290 A * | 5/1996 | Quigley et al. | 434/129 |
| 5,639,242 A * | 6/1997 | Wilson | 434/238 |
| 5,716,211 A * | 2/1998 | Vetter | 434/107 |
| 5,725,381 A * | 3/1998 | Kollath et al. | 434/238 |
| 5,743,528 A * | 4/1998 | Downey-Jerome | 273/249 |
| D403,025 S * | 12/1998 | Martinez | D21/337 |
| 6,203,327 B1 * | 3/2001 | Ottrando | 434/262 |
| 6,572,380 B1 | 6/2003 | Buckley et al. | |
| 7,326,059 B2 * | 2/2008 | Habing et al. | 434/236 |
| 7,347,693 B2 * | 3/2008 | Low et al. | 434/236 |
| 8,074,990 B2 * | 12/2011 | Kennedy et al. | 273/241 |
| 8,108,279 B2 * | 1/2012 | Galit et al. | 705/35 |

(Continued)

*Primary Examiner* — Kurt Fernstrom
*Assistant Examiner* — Dolores Collins
(74) *Attorney, Agent, or Firm* — Caesar, Rivise, Bernstein, Cohen & Pokotilow, Ltd.

(57) ABSTRACT

A game and method of play for motivating children to exhibit good behavior is disclosed. The game includes a game board, plural tickets, plural reward markers, and at least one bank. The board represents a store at which various real-world reward items may be acquired. Each token represents a predetermined value. The tokens are acquired in response to completing an assigned task or in response to taking an action exhibiting good behavior. The reward markers are arranged to be releasably secured to the board and represent a real-world reward that can be acquired by the child who accumulates a sufficient number of tickets equaling a redemption value of the reward marker. The bank is assigned to the child for receipt of acquired tokens and can be opened to remove the tokens for redemption so that the child may claim the real-world reward represented by the reward marker.

9 Claims, 8 Drawing Sheets

U.S. PATENT DOCUMENTS

| | | | |
|---|---|---|---|
| 8,145,549 B2* | 3/2012 | Das | 705/35 |
| D659,945 S* | 5/2012 | Weatherley | D99/41 |
| 2001/0034013 A1* | 10/2001 | Bennett | 434/238 |
| 2005/0042586 A1* | 2/2005 | Carpenter et al. | 434/238 |
| 2006/0033276 A1* | 2/2006 | Evans et al. | 273/259 |
| 2006/0172268 A1* | 8/2006 | Thurman | 434/236 |
| 2007/0241499 A1* | 10/2007 | Novakovich et al. | 273/236 |
| 2007/0278741 A1* | 12/2007 | Woodbury et al. | 273/249 |
| 2011/0003525 A1* | 1/2011 | Weatherley | 446/8 |
| 2012/0021392 A1* | 1/2012 | Bock | 434/238 |

* cited by examiner

The Rules of The Ticket Store Game

Here are the rules:

1. Your children have to listen the first time or they will not earn the maximum number of tickets.

For example, for a 3 ticket task, ask once=3 tickets.

Ask twice=2 tickets. Ask three times=1 ticket.

If they end up with no tickets, they still need to do what they have been asked to do.

2. Good behavior = store open for redeeming tickets.

Bad behavior = store closed and no redeeming tickets.

If behavior improves = store reopens.

3. Parents/teachers responsibility;
   a. Hand out tickets;
   b. Keep tickets that have not been handed out in a place that is not accessible to your children.

4. If there are unused tickets at the end of the day, they can only carry over to the next day (or be accumulated over many days for rewards which require many tickets i.e. the purchase of a new game or a sleep over).

5. After each task is completed, you give your children their tickets and they put them in their ticket bank.

**The ticket should be given with praise to your child.
   Praise is very important to the success of the Ticket Store Game.**

6. You will find that after your children have learned the rules of the Ticket Store Game and what things they need to do, you should not have to ask them to do things. That is our goal.

The Ticket Store Game is the fun way to better behavior for your kids!!!

48 www.ticketstoregame.com

The Ticket Store Game Requirements
Home

You can earn tickets to use at the Ticket Store by doing the following at home:

| To Earn Tickets: | Suggested Number of Tickets: |
|---|---|
| Making your bed | 3 |
| Brushing your teeth | 3 |
| Getting yourself dressed | 3 |
| Taking a shower or bath | 3 |
| Cleaning up your playroom | 3 |
| Being a good listener | 3 |
| Setting the table for dinner | 3 |
| Clearing your dishes after meals | 3 |
| Taking out the garbage | 3 |
| Cleaning up after yourself without being asked | 3 |
| Keeping your room clean | 3 |
| Putting toys and/or your games away | 3 |
| Not whining the whole day | 3 |
| Not fighting with your brother and/or sister | 3 |
| Not using bad words | 3 |
| Emptying the dishwasher | 3 |
| Helping with the Laundry | 3 |
| Reading a book | 3 |
| Getting a good grade on your report card | 9 |
| Getting a good grade on a test | 3 |
| Eating your vegetables | 6 |

What other things can you think of with your family to earn tickets?

_______________________   _______
_______________________   _______
_______________________   _______
_______________________   _______
_______________________   _______
_______________________   _______
_______________________   _______

Once you have earned your tickets, get ready for fun because it is time to go visit the Ticket Store!

Additional Suggestions:

1. Some tasks may be too difficult to do. You may have to adjust the task. For example, a child may not be able to keep from whining all day but he or she may be able to do it for an hour!
2. You can adjust the number of tickets earned based upon the age of your child.

The Ticket Store Game is the fun way to better behavior for your kids!!!

www.ticketstoregame.com

GOOD BEHAVIOR MOTIVATION GAME FOR CHILDREN AND METHOD OF USE

CROSS-REFERENCE TO RELATED APPLICATIONS

This application claims priority from U.S. Provisional Application Ser. Nos. 61/175,928, filed on May 6, 2009, entitled Ticket Store Game and 61/258,335, filed on Nov. 5, 2009, entitled Ticket Store Game, whose disclosures are incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates generally to games and more particularly to games for motivating children to exhibit good, desirable behaviors at home and in school.

BACKGROUND OF THE INVENTION

The patent literature discloses a number of games or other devices for teaching children good habits or motivating them to good behavior, while also providing some diversion for the players/users. For example, U.S. Pat. No. 1,638,094 (Gilmore) discloses a game having a board including a path or course divided into spaces forming units of progress that the child is to make to provide mental and moral training. A spinner is provided to enable the child to advance along the path according to the number indicated by the spinner.

U.S. Pat. No. 2,414,614 (Shurick) discloses a board having a plurality of horizontal channels formed therein. Each of the channels contains a slide which may be advanced along the corresponding channel during the course of a week, according to the behavior of the child corresponding to the particular slide. A coin or the like is deposited at the end of each slide, to drop from the board when the slide reaches the far end of its travel and pushes the coin from the board.

U.S. Pat. No. 2,883,765 (Blaine) discloses a vertically oriented board having a series of tags hanging thereon for daily chores, and a second series of tags representing bonuses and fines. A cylinder for holding coins is installed along the right hand edge of the device. Coins are given to the child at the end of each day, depending upon the chores completed and/or any fines for non-accomplishment of the chores. The child is expected to place at least some of his or her accrued coins into the coin holding cylinder, to encourage saving.

U.S. Pat. No. 3,782,009 (Darnell) discloses a board having a plurality of row and column slots therein. A leftmost column provides for the names of a plurality of students, while an upper row provides a list of desirable traits, habits, tasks to be completed, etc. A marker is placed within the corresponding slot whenever a student completes one of the upper row items satisfactorily. The markers are later exchanged for a reward.

U.S. Pat. No. 4,273,337 (Carrera et al.) discloses a board game apparatus is provided which is intended to facilitate communication between parents and children regarding facts and attitudes in the area of human sexuality and to provide learning experiences which will lead to improved communication between parents and their children. The game includes a plurality of player tokens, a game board having a closed continuous path defined by a multiplicity of playing spaces, and three decks of cards, each of which contains questions concerning the field of human sexuality. The decks are distinguishable from one another according to degree of difficulty. There is also provided a fourth deck of cards which contains discussion questions for discussing various attitudes concerning human sexuality and a score sheet for scoring one's correct answers according to category.

U.S. Pat. No. 4,776,799 (Walsh) discloses a foldable panel having a list of jobs or chores for each of several persons, and a series of beads strung upon a lateral string for each person. As each chore is completed, the appropriate bead is moved from a "Do" position to a "Done" position. Parents, teachers, or supervisors provide some indication of award on a card when all chores for a given period are complete. When the card is filled, the award is provided to the child or student.

U.S. Pat. No. 5,482,487 (Harris) discloses a motivational savings bank set including a savings bank and imitation money (e.g., bills or coins) that can be used to motivate children by rewarding them for various levels of scholastic achievement by providing them with the imitation money upon attainment of scholastic goals.

U.S. Pat. No. 5,470,235 (Papaleo) discloses a child behavior improvement system comprises a support member having a plurality of receptacles for receiving indicia of a reward, multiple discs having indicia defining a reward positioned in each of the receptacles and a cover for covering each receptacle. The cover is at least partially removable for providing access to the reward. Selectable indicia are provided for positioning on the cover for identifying a desirable behavior goal.

U.S. Pat. No. 5,639,242 (Wilson) discloses an educational system for motivating, monitoring and rewarding children's task performance and comprises a base having a playing surface demarcated to resemble a road in a continuous circuit form. Loop fasteners are attached to a plurality of discrete areas within the road area, and the discrete areas are organized into a circuitous route. A second plurality of discrete areas with loop fasteners attached, form temporary playing piece waiting areas. The system utilizes separate areas to identify the start and reward positions. Hook fasteners affixed to a playing piece allows the playing piece to be attached to the loop fastener material of discrete areas. A plurality of chore cards is used to delegate tasks to be accomplished by the participant. A plurality of banking cards is used by participants to record the rewards earned by task completions.

U.S. Pat. No. 5,725,381 (Kollath et al.) discloses a motivation system for children that consists of a board, play money of various denominations, and coupons for various predefined rewards. The board is a flat rectangular rigid sheet with a schedule information area, a rewards information area. An erasable felt tip marking pen with a pen holder is also provided. The schedule information area contains a first column for listing the time of day, a second column for listing the behavior the child is to perform, and a third column for listing the quantity of play money to be received by the child. The rewards information area contains a first column for listing rewards that may be purchased, and a second column for listing the play money purchase price of reward.

U.S. Pat. No. 6,572,380 (Buckley et al.) discloses a game and a method for teaching favorable behavioral patterns. The game includes a portfolio and an allowance system in cooperative engagement with the portfolio. The portfolio includes a plurality of tab cards and a score unit for receiving the tab cards. The allowance system includes an allowance element as a unit of exchange between what is earned by a player and a tangible reward outside of the play situation. Accordingly, a method for teaching favorable behavioral patterns includes incorporating the game unit with a routine of a player for a predetermined period, such as a daily routine. The player is credited via the tab cards throughout the predetermined period for favorable and unfavorable behavior while performing the routine. At the end of play, a value received from calculating the awarded tab cards is used to determine a value of an allowance element to be received. The allowance element can be redeemed by the player for a tangible reward, e.g., money, a valued play object, or a pleasurable activity.

While the games/devices disclosed in those patents may be generally suitable for their intended purposes they nevertheless appear to leave something to be desired from various standpoints, e.g., effectiveness, adaptability and fun.

The subject invention addresses those needs.

SUMMARY OF THE INVENTION

In accordance with one aspect of the invention there is provided a motivational game for encouraging good behavior activity by children. The game basically comprises a game board, a plurality of tokens, a plurality of reward markers, and at least one bank.

The game board includes indicia representing a store at which various real-world reward items may be acquired by a child playing the game and also includes plural locations for receipt of respective ones of the reward markers.

Each of the tokens represents a predetermined value and bears indicia representative of that value. At least one token is arranged to be acquired by the child in response to completing an assigned task or in response to taking an action exhibiting good behavior. The assigned task or action of good behavior is established by an adult playing the game.

Each of the reward markers bears indicia representative of a real-world reward that can be acquired by the child who accumulates a sufficient number of tokens equaling a redemption value of the reward marker. The redemption value is established by an adult. Each reward marker is arranged to be releasably secured to the game board at a respective one of the locations thereon.

The receptacle is arranged to be assigned to the child for receipt of tokens acquired by the child and is arranged to be opened to enable tokens to be removed therefrom by the child to be redeemed for reward markers at the redemption value, whereupon when a sufficient number of tokens equaling the redemption value for a particular reward have been acquired they may be removed from the receptacle and traded for the desired reward marker so that the child may claim the real-world reward represented by that reward marker.

In accordance with another aspect of this invention there is provided a method of encouraging good behavior activity by a child playing a game with at least one adult. The method basically entails providing a game comprising a game board bearing indicia representing a store at which various real-world reward items may be acquired by the child. The game board also includes plural locations for receipt of respective ones of a plurality of reward markers. A plurality of tokens is also provided, along with the plurality of reward markers and at least one bank. Each of the tokens represents a predetermined value, with each token bearing indicia representative of that predetermined value. The bank is arranged for receipt of the tokens.

Each of the reward markers bears indicia representative of a real-world reward that can be acquired by the child who completes a desired task or who exhibits good behavior. A list of assigned tasks or actions of good behavior is provided for the child, with each of the assigned tasks or actions of good behavior having an assigned value.

An adult establishes a redemption value for each of the reward markers and the child is advised of the value of each of the reward markers. The child selects at least one reward marker from the plurality of reward markers, with the reward marker selected being indicative of a particular real-world reward that the at least one child wishes to receive. The selected reward marker is then releasably secured onto one of the locations on the game board.

The child then undertakes a task from the list or exhibits an action of good behavior from that list. In response thereto, an adult provides the child with at least one token, which the child deposits in the bank. When the child has sufficient tokens within the bank totaling the redemption value of the reward marker that the child wishes the child redeem that number of tokens to claim the real-world reward represented by that reward marker.

DETAILED DESCRIPTION OF THE PREFERRED EMBODIMENT

Figure 1:
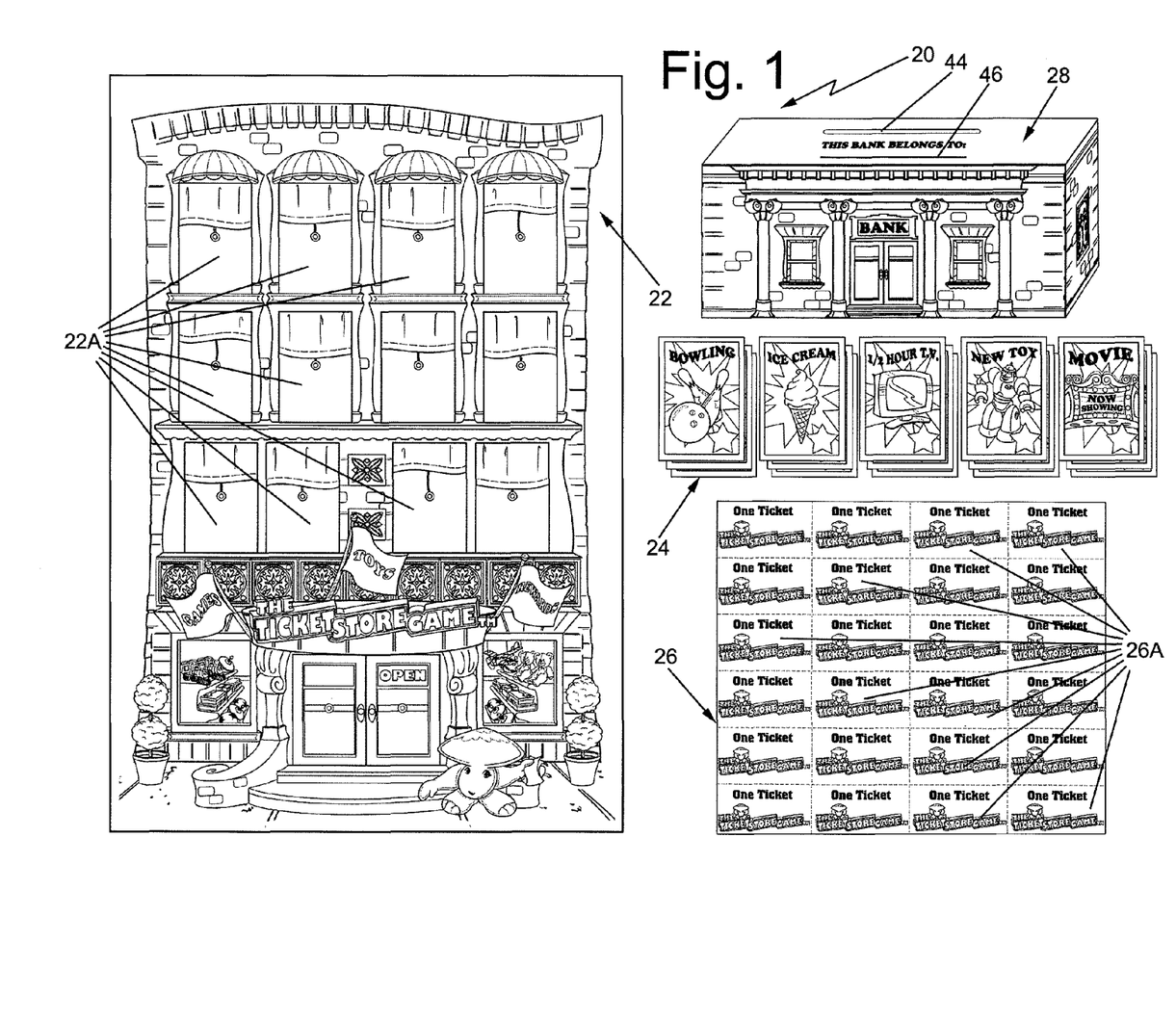
FIG. 1 is an isometric view of the various components, i.e., the game board, reward markers, tokens and one exemplary receptacle (e.g., a bank), making up one exemplary embodiment of the game of this invention.

Referring now to the various figures of the drawing wherein like reference characters refer to like parts, there is shown in FIG. 1 at 20 a game that enables adults playing with their children or other children will allow each child to learn the importance of good behavior by rewarding him/her with the ability to acquire real-world reward items (tangible rewards outside of the play situation), such as permission to play an electronic game, go to a movie, rent a video, have an ice cream treat or candy, etc., by accomplishing a desired task(s) or exhibiting an action indicative of good behavior. As will be seen in the discussion to follow, the game also introduces children to the concepts of finances, savings in addition to rewarding them for their efforts. The game basically comprises a game board 22, a plurality of reward markers (e.g., cards) 24, a plurality of tokens (e.g., tickets) 26A and at least one receptacle (e.g., bank) 28 for receipt of the tokens.

As best seen in FIG. 1 the game board 22 basically comprises a generally flat panel that is arranged to be disposed on a horizontal surface, such as a table, or suspended vertically from some member, so that the players of the game can reach any portion of it. More details about the game board will be described later.

Figure 3:
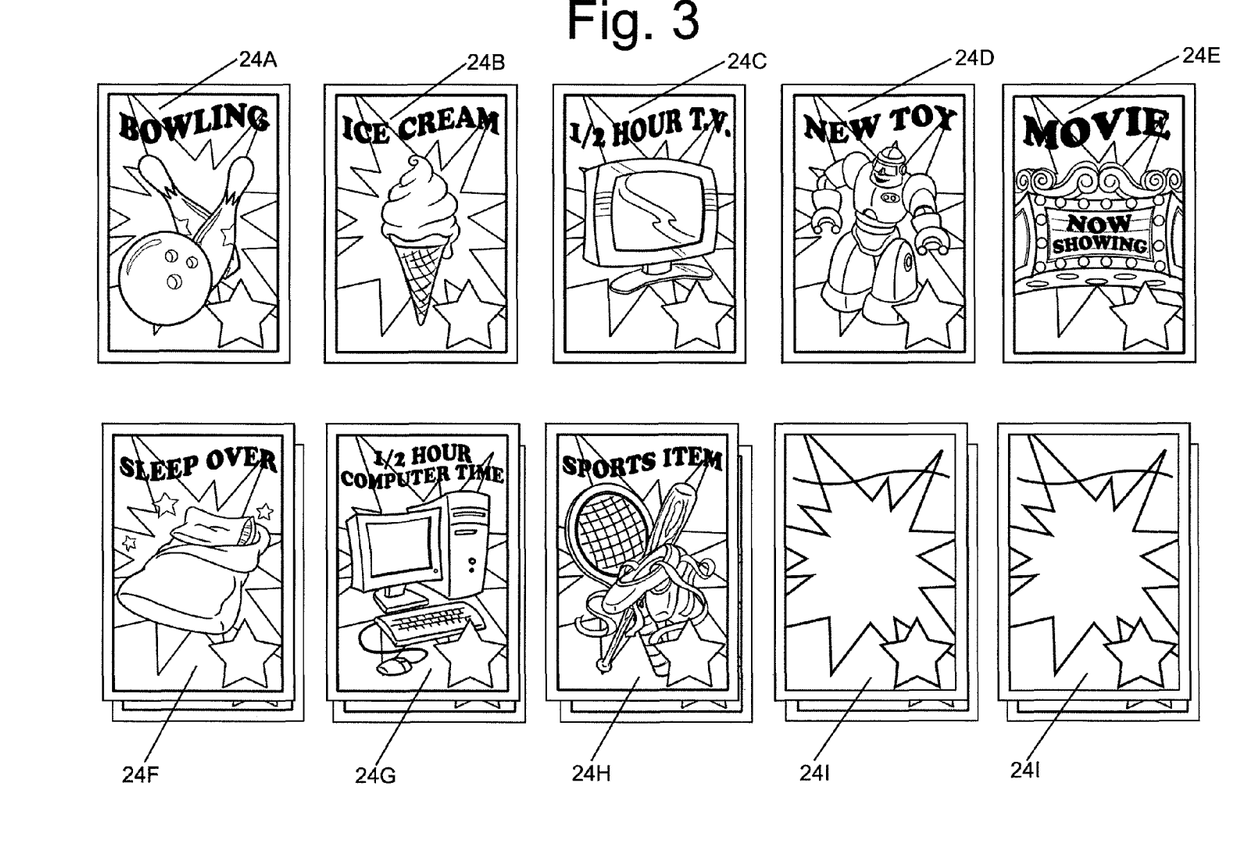
FIG. 3 is an enlarged top plan view of an exemplary set of reward markers (e.g, cards) shown in FIG. 1.

As best seen in FIG. 3, the reward markers 24 are each in the form of a card, e.g., a cardboard or plastic card. Each card bears indicia representative of a real-world reward that can be acquired by the child who completes an assigned task or who takes an action of good behavior. For example, as best seen in FIG. 3, reward card 24A includes graphics showing a bowling ball and pins and represents permission to go bowling. Reward card 24B includes graphics showing an ice cream cone represents permission to get an ice cream treat. Reward card 24C includes graphics showing a television and represents permission to watch television for a half hour. Reward card 24D includes graphics showing a toy and represents permission to get a new toy. Reward card 24E includes graphics showing a movie theater and represents permission to go to the movies. Reward card 24F includes graphics showing a sleeping bag and represents permission to have a sleep-over. Reward card 24G includes graphics showing a computer and represents permission to be able to use the computer for a half hour. Reward card 24H includes graphics showing various sports equipment and represents permission to be able to get a selected sports item. As can also be seen some of the reward cards 24I include blank areas. Those areas are arranged to be filled in with indicia representing other rewards which an adult and the child or children playing the game deem appropriate to represent an agreed upon reward. It must be pointed out that the various rewards shown are merely exemplary of a myriad of rewards that can be selected for inclusion in the game. Thus, other examples of real-world rewards are listed on the Recommended Rewards 32 game sheet shown in FIG. 8. It should be noted that the rewards listed on the sheet 32 are merely exemplary of a multitude of rewards that can be provided as an incentive to good behavior in accordance with the teachings of this invention. Moreover, the game of this invention contemplates that an adult may consult with the child or children playing the game to select other rewards. To that end, the sheet 32 includes various blanks that can be filled in with other rewards available to the child playing the game.

Figure 8:
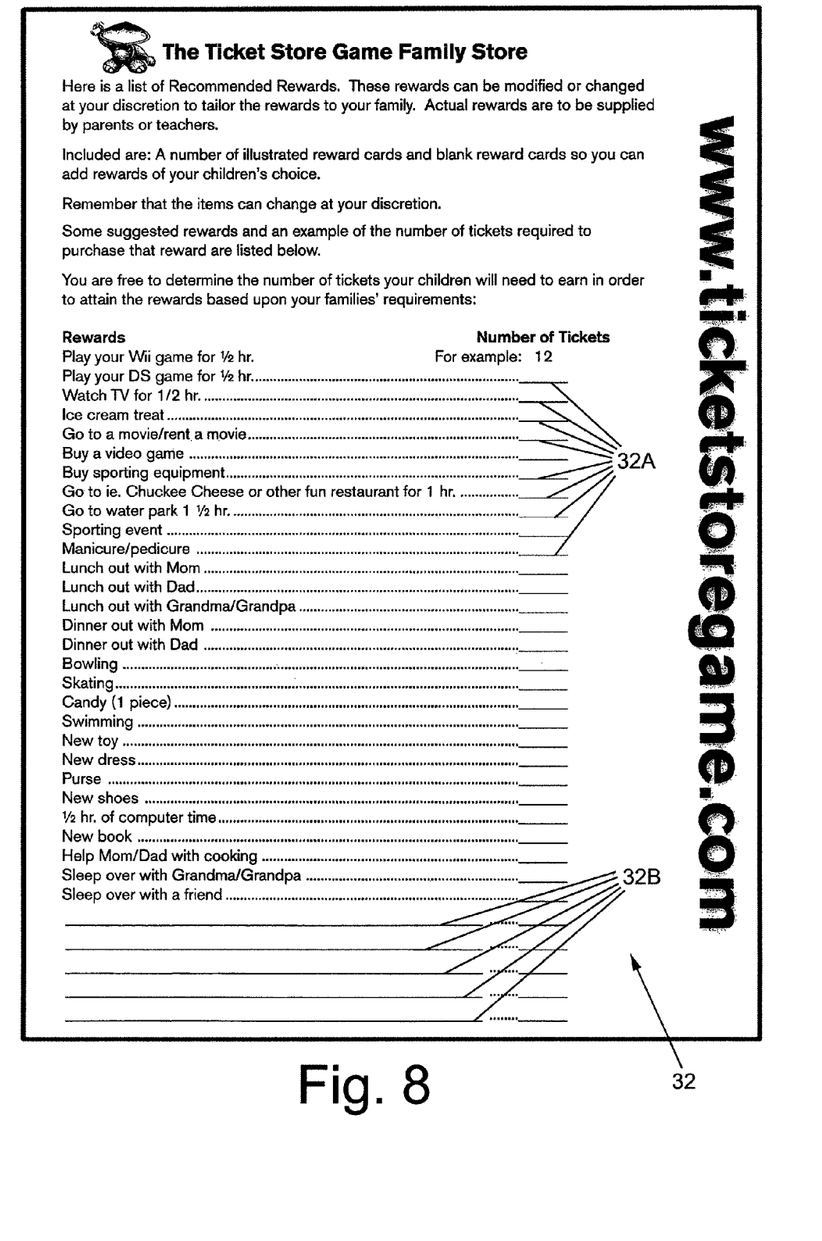
FIG. 8 is a top plan view of a sheet of recommended rewards for the game.

Each of the reward markers 24 has a redemption value that is established by an adult playing or organizing the game. These redemption values are shown on the Recommended Rewards game sheet 32. The rewards may have a predetermined or predefined redemption value or one that is established by the adult(s) playing or organizing the game. In fact, for many applications, it is desirable that the redemption value be decided by consultation between that adult and the child or children playing the game to encourage their participation and enthusiasm for the game. The redemption value chosen for each reward is preferably filled in on the appropriate blank line 32A of a list of rewards on the game sheet 32. As can be seen the game sheet 32 also include blank areas 32B into which other rewards may be listed, with their corresponding redemption values.

Figure 9:
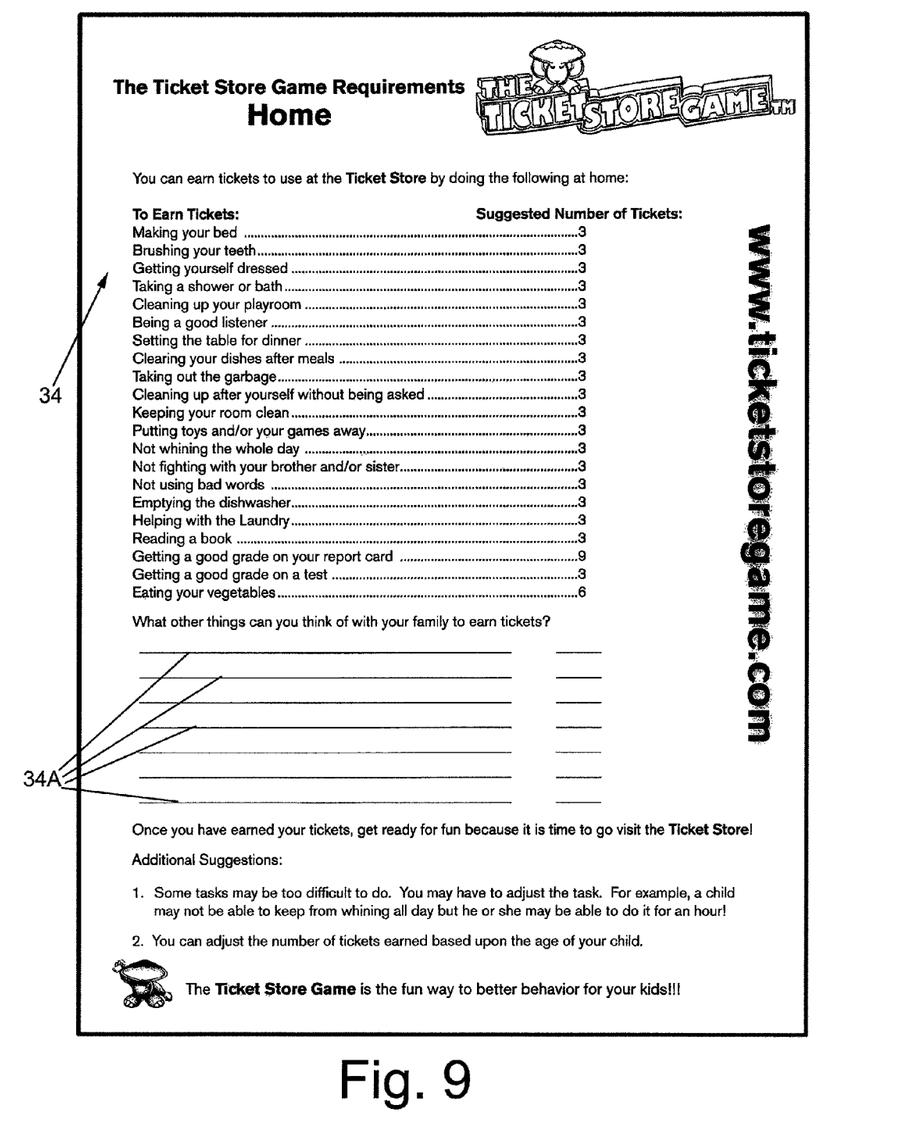
FIG. 9 is a top plan view of a sheet of desirable tasks and behaviors for the child to accomplish at home as part of the game.
Figure 10:
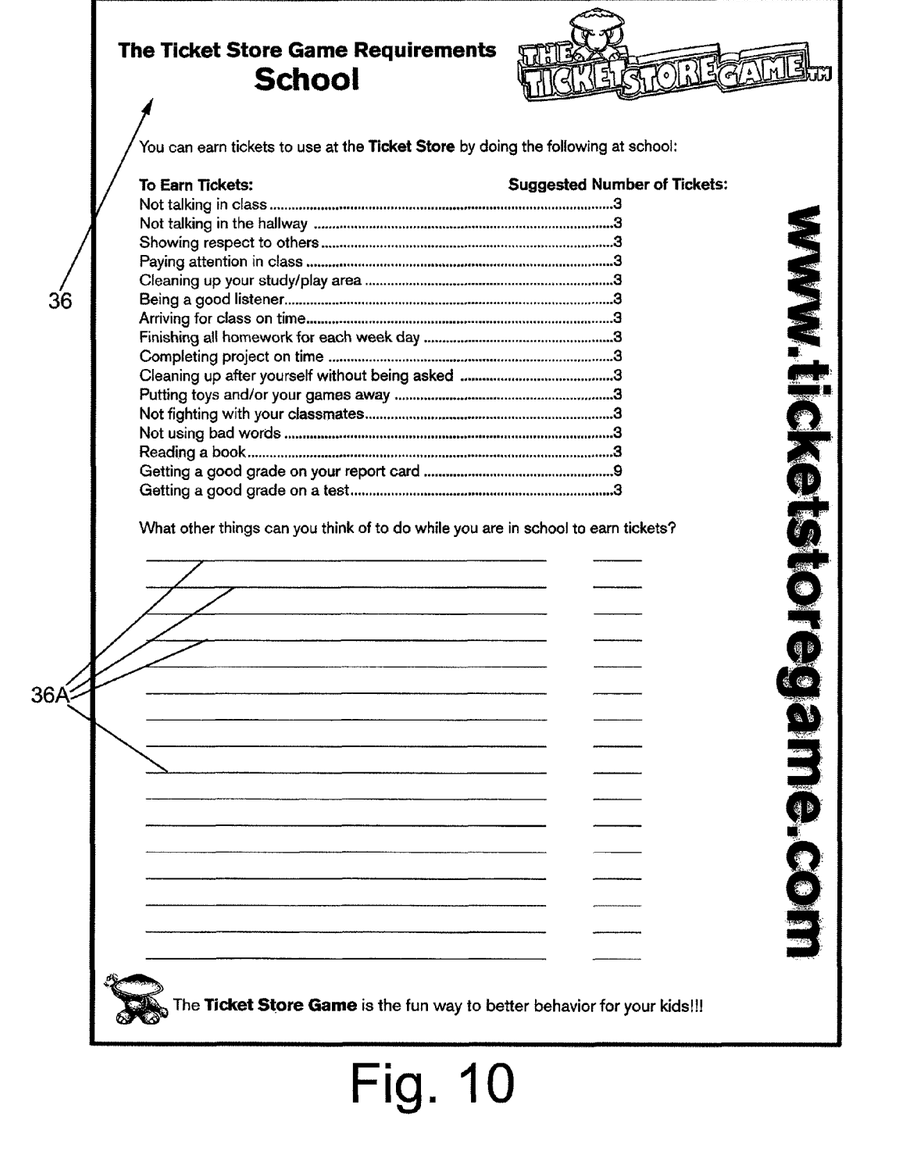
FIG. 10 is a top plan view of a sheet of desirable tasks and behaviors for the child to accomplish at school as part of the game.

In the exemplary embodiment of this invention each of the tokens 26A is in the form of a ticket. The tickets are initially provided as a perforated sheet 26, like that shown in FIG. 1, so that each of the tickets can be separated from one another. Each of the tickets represents a predetermined value, e.g., "one ticket" in the exemplary embodiment shown, and bears indicia representative of that value. The tickets 26 are arranged to be acquired by the child in response to completing an assigned task or in response to taking an action exhibiting good behavior. That assigned task or action of good behavior is established by an adult playing or organizing the game. Examples of suggested desirable tasks or behaviors for the home are shown on a list of Requirements game sheet 34 (see FIG. 9). Examples of suggested desirable actions or behaviors for school are shown on a list of Requirements game sheet 36 (see FIG. 10). The tasks/behaviors listed may have a predetermined or predefined ticket value, such as "3 tickets" as shown in FIGS. 9 and 10. If desired the ticket value can be changed by the adult, depending upon circumstances, either in consultation with the child or children playing the game or can be done unilaterally. For example, the number of tickets earned for a particular task may be decreased, depending upon how many times the adult has to remind the child to undertake the task or take the desired action exhibiting good behavior. The game sheets 34 and 36 also include blank areas, 34A and 36A, respectively, into which other tasks/behaviors may be listed, with their corresponding ticket values.

Figures 4, 5:
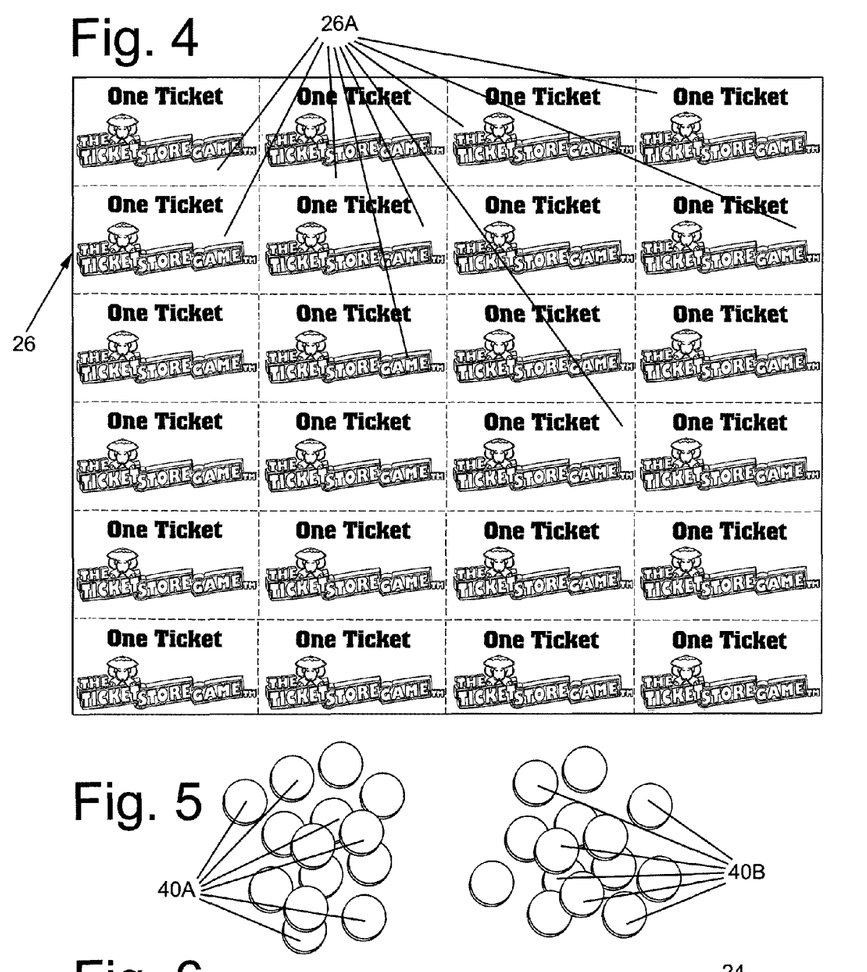
FIG. 4 is an enlarged top plan view of a sheet of tokens (e.g., tickets) shown in FIG. 1.
FIG. 5 is an enlarged top plan view of a set of cooperating Velcro® components for releasably securing respective ones of the reward markers to selected portions of the game board shown in FIG. 1.
Figure 6:
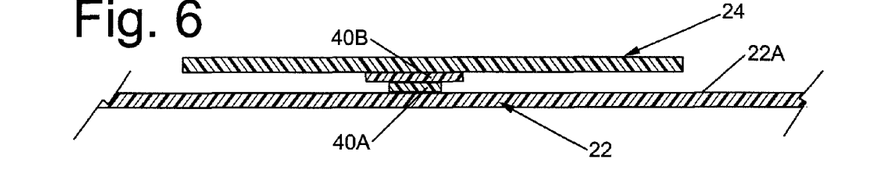
FIG. 6 is an enlarged sectional view taken through the game board, a pair of cooperating Velcro® components and a representative reward card, to show how that reward card is releasably secured to the game board via those Velcro® components.

As shown in FIG. 1, the game board 22 includes indicia bearing the words "THE TICKET STORE" and graphics representing a store at which various real-world reward items may be acquired by a child playing the game. In the exemplary embodiment shown the store is in the form of the representation of a building having plural areas 22A, each in the form of a graphic representation of a window having a partially drawn window shade. Each of the areas 22A is arranged to releasably mount any one of the reward cards 24 selected by the child. To that end, the game also includes plural VELCRO® multi-hook and multi-loop (plush) connectors 40A and 40B. In the exemplary embodiment of the invention shown the VELCRO® multi-hook and multi-loop connectors 40A and 40B are each of circular or button shape as shown in FIG. 5. A respective one of those connectors, either the multi-loop connector or the multi-hook connector is arranged to be fixedly secured to each of the locations 22A. In particular, those connectors can be fixedly secured to the graphic representation of the window shade pull in each of the areas 22A. The cooperating ones of those connectors are arranged to be fixedly secured to the rear surface of the reward markers that the child selects. In FIG. 6 there is shown an enlarged cross sectional view showing a typical reward card 24 releasably mounted on the game board 22 at any particular location 22A via a pair of cooperating VELCRO® multi-hook and multi-loop connectors 40A and 40B.

Figure 2:
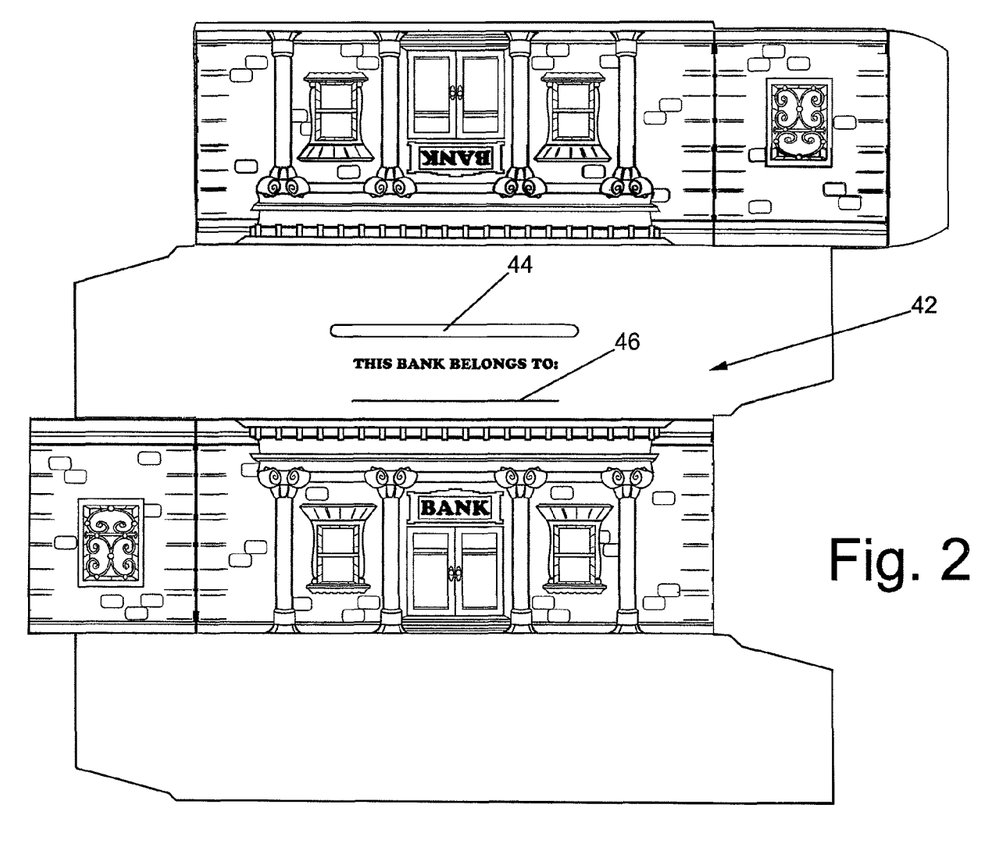
FIG. 2 is an enlarged top plan view of a printed blank sheet which is arranged to be folded to form the receptacle shown in FIG. 1.

As mentioned earlier the game includes at least one receptacle 28 for receipt of tickets earned by a child playing the game. In the exemplary embodiment the receptacle is in the form of a bank. To that end, a cardboard blank 42 (FIG. 2) is provided which can be folded and assembled to form a hollow box having indicia thereon representative of a bank like shown in FIG. 1. The receptacle 28 includes a slot 44 through which tickets earned can be inserted. The sides of the receptacle/box are arranged to be opened so that tickets can be removed for redemption when desired. In accordance with one preferred aspect of this invention each child playing the game is given his/her own bank. Moreover, each bank includes a blank line 46 (FIGS. 1 and 2) on the top portion adjacent the slot 44 onto which indicia bearing the name of the child can be put to signify ownership by the child of that bank and its contents. The indicia on the bank are arranged so that the bank may be colored by the child to whom it is assigned.

Figure 7:
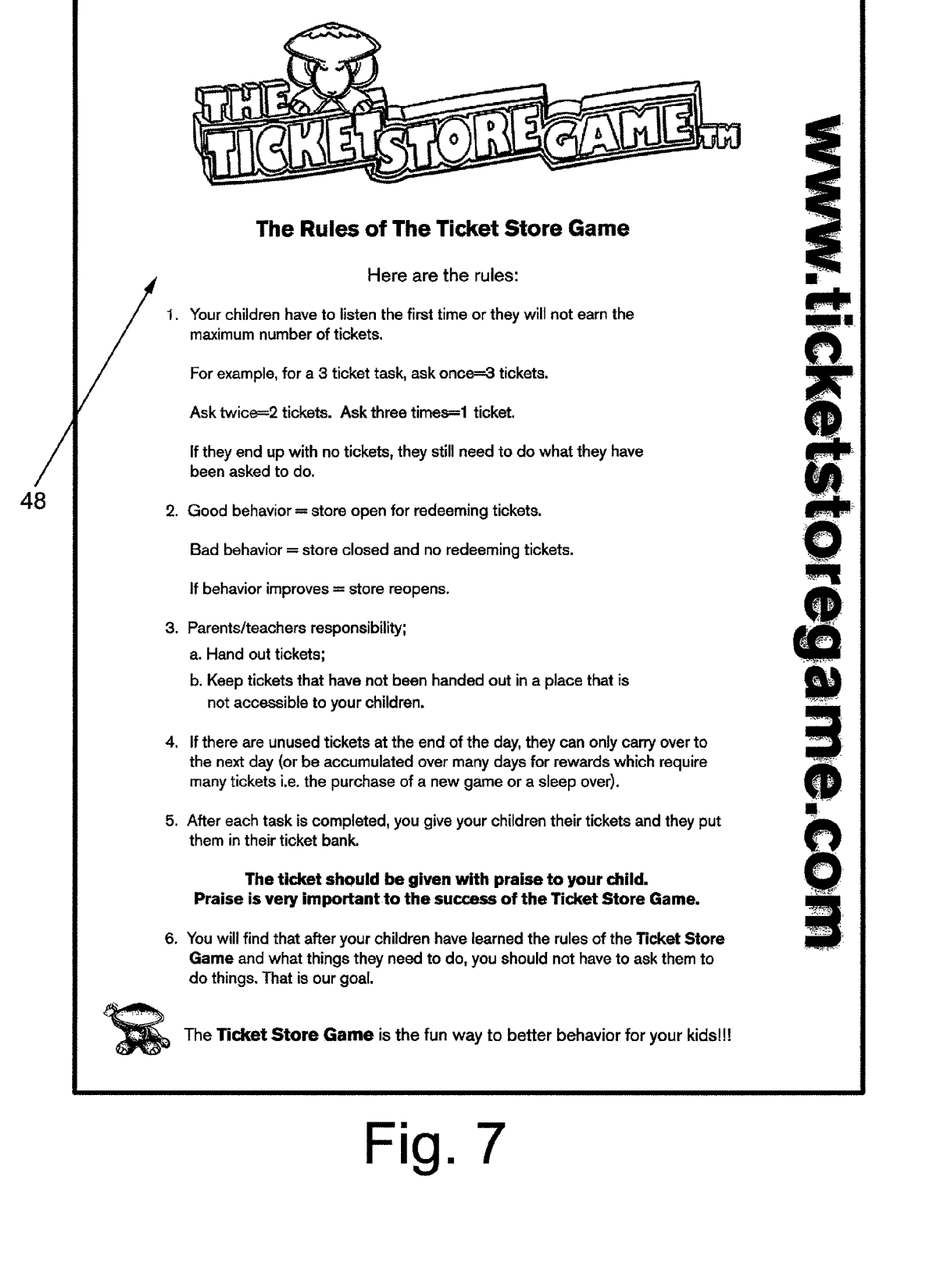
FIG. 7 is a top plan view of a sheet of instructions for playing the game.

Game play is as follows: first, the rules of the game, found on an instruction sheet 48 and shown in FIG. 7, are read by an adult to the child or children playing the game. Next, a review of the game's home and school requirements as set forth on sheets 34 and 36, respectively, is conducted. Requirements (tasks/behaviors) can be added or deleted as desired and the number of tickets earned by that behavior can also be established or adjusted to tailor the game to the particular players. It is advisable at this stage for the adult to include the children in the process of establishing productive ways for them to earn tickets. Now, it is time to set up and stock THE TICKET STORE that is represented on the game board 22.

The game can be played by placing the game board flat or by hanging the game board using a string (not shown) or by use of some of the VELCRO® fasteners. Those fasteners are also applied to the game board and the desired reward cards. As mentioned earlier the banks 28 are arranged to be colored by the children playing the game and each child should put his or her name on their bank on the line 46 provided. Including the children in these activities is important as it develops a sense of ownership of the game and the process. As discussed above the game includes a number of illustrated rewards on the cards 24 that attach to the game board 22 by the VELCRO® fasteners. The adult playing or organizing the game should write in the number of tickets required to obtain the reward on each reward card.

The adult and child/children playing the game are free to pick from the pre-illustrated rewards or can establish their own rewards by using the enclosed blank reward cards 24E and filling in the reward of the child's choice and the number of tickets required to obtain the reward. This is a great opportunity to have the child participate in deciding his or her own reward and acts as a great motivator. Once the child/children have selected the reward cards, they are attached to the game board 24 via use of the VELCRO® fasteners. The reward cards can be changed by the child/children daily depending on what rewards the child/children want to attain for that particular day.

Next, the adult should help the child/children carefully separate the individual tickets 26A from one another from the ticket sheet 26 shown in FIGS. 1 and 4 and the individual tickets 26A should be given to the adult to hold. The tickets will be given by the adult to the child/children as they earn them by completing the desired task or exhibiting the desired behavior. The children should place all earned tickets in the bank when they are received. This process reinforces the concept of saving.

The adult can also use the game and its process along with the teacher(s) of the child/children. To that end, included in the game is the heretofore identified sheet 36 bearing the list of behaviors at school for which children can earn tickets. The adult can coordinate with the teacher(s) to add to or delete from this list in order to build good behavior at home and at school.

The adult playing or organizing the game can determine when the child/children is permitted to visit THE TICKET STORE to redeem his/her/their tickets. At the time of the visit, the child should go to the bank 28, open it up to count out and deliver to the adult the number of tickets necessary to redeem (buy) the reward. If there are earned but unused tickets at the end of the day, they can only carry over to the next day (or accumulated over many days for rewards which require many tickets), i.e. the purchase of a new game or a trip to the ice cream store. Otherwise, all tickets should be spent through a trip to the store on the day in which they are earned.

Long term success of the game and improvement of behavior is dependent on parents or other adults (and the children's teacher to the extent you are incorporating school behavior) keeping the game going. Positive reinforcement is the key. Every time the child performs a task (for example when the child makes his or her bed) such good behavior should be reinforced with comments like "Don't you feel good about how your room looks when you make your bed!" Positive reinforcement should help in establishing long lasting good habits and behavior. The adult(s) playing or organizing the game may have to reassess goals to be achieved depending on whether it is school time or summer time. Consistency in how tickets are earned and how the adult(s) will allow the children to purchase rewards is of considerable importance. Catch the child being good, and reward him or her for that good behavior.

It must be pointed out at this juncture that the game specifically disclosed heretofore is merely exemplary of numerous games that can be made in accordance with the basic teachings of this invention. Thus, the type of game board, tokens, reward markers and banks can be designed and constructed for any particular situation.

Without further elaboration the foregoing will so fully illustrate our invention that others may, by applying current or future knowledge, adopt the same for use under various conditions of service.

We claim:

1. A method of encouraging good behavior activity by at least one child playing a game and rewarding the child playing the game with a real world reward earned by the child from play of the game with at least one adult comprising:
 (a) providing a game comprising a game board bearing indicia representing a store at which various real-world reward items may be acquired by the at least one child, said game board including plural locations, each of said locations including a releasably securable connector mounted thereon, a plurality of tokens each of said tokens representing a predetermined value, each of said tokens bearing indicia representative of said predetermined value, a bank for receipt of said tokens, and a plurality of reward markers, each of said reward markers having a front surface bearing fanciful graphics and text indicia representative of a real-world reward that can be acquired by said at least one child who completes a desired task or who exhibits good behavior, each of said reward markers having a rear surface opposite said front surface, each of said rear surfaces including a cooperating releasably securable connector;
 (b) providing a list of assigned tasks or actions of good behavior for said at least one child, each of said assigned tasks or actions of good behavior having an assigned value;
 (c) said at least one adult establishing a redemption value for each of said reward markers and advising the child of the value of each of said reward markers;
 (d) said at least one child selecting at least one reward marker from said plurality of reward markers, said at least one reward marker being indicative of a particular reward that said at least one child wishes to receive;
 (e) releasably securing said selected at least one reward marker onto a selected one of said locations on said game board by causing said cooperating releasably securable connector on said rear surface of said at least one selected reward marker to releasably engage said releasably securable connector on said game board at said selected one of said locations, whereupon said reward marker is readily visible at said selected one of said locations;

(e) said at least one child undertaking a task from said list or exhibiting an action of good behavior from said list;

(f) an adult providing said at least one child with at least one token in response to the accomplishment of said task or action of good behavior;

(g) said at least one child depositing said at least one token in said bank, whereupon when said at least one child has sufficient tokens within said bank totaling the redemption value of the reward marker said at least one child wishes said at least one child may open said bank to retrieve said tokens and redeem that number of tokens to claim the real-world reward represented by said reward marker; and (h) an adult giving the child the real world reward claimed by the child.

2. The method of claim 1 wherein the number of tokens provided to said at least one child is a function of the number of times that an adult has to remind the child to perform the task or undertake the action of good behavior.

3. The method of claim 1 wherein the assigned value for each of said tasks or actions of good behavior is established by an adult based on the age of the child.

4. The method of claim 1 wherein said tasks or actions of good behavior are to be completed by the child at home.

5. The method of claim 1 wherein said tasks or actions of good behavior are to be completed by the child at school.

6. The method of claim 1, wherein said selected at least one reward marker removed from said location on said game board when it is redeemed.

7. The method of claim 1 wherein at least one of said reward markers has a blank area, and wherein said method additionally comprises an adult or said at least one child applying indicia representative of a particular real-world reward onto said blank area of said reward marker.

8. The method of claim 7 wherein said particular real-world reward is determined by the agreement of the adult and child.

9. The method of claim 1 wherein said game is played by plural children, with each child being assigned a respective bank for receipt of tokens earned by that child.

* * * * *